US007567170B2

(12) United States Patent
Fuerst et al.

(10) Patent No.: US 7,567,170 B2
(45) Date of Patent: Jul. 28, 2009

(54) DEVICE FOR REPRODUCING INFORMATION ON A VEHICLE

(75) Inventors: Sigmund Fuerst, Maisach (DE); Michael Hackenberg, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 250 days.

(21) Appl. No.: 11/446,156

(22) Filed: Jun. 5, 2006

(65) Prior Publication Data

US 2007/0013501 A1 Jan. 18, 2007

Related U.S. Application Data

(63) Continuation of application No. PCT/EP2004/010309, filed on Sep. 15, 2004.

(30) Foreign Application Priority Data

Dec. 4, 2003 (DE) ................................ 103 57 456

(51) Int. Cl.
*B60Q 1/00* (2006.01)

(52) U.S. Cl. ..................... 340/438; 340/10.5; 340/5.72; 340/426.15; 73/23.2; 73/23.36

(58) Field of Classification Search ................ 340/5.72, 340/5.28, 5.61, 5.31, 572.1–572.9, 426.15, 340/10.5, 10.41; 73/23.2, 23.36
See application file for complete search history.

(56) References Cited

U.S. PATENT DOCUMENTS 5,218,347 A * 6/1993 Deppe ........................ 340/634
5,905,431 A * 5/1999 Mueller et al. ......... 340/426.17
5,948,962 A 9/1999 Matthiessen
6,580,972 B1 * 6/2003 Strohbeck ...................... 701/1
6,647,773 B2 * 11/2003 Nantz et al. ................ 73/146.5
6,895,805 B2 * 5/2005 Hoagland .................. 73/31.06
7,145,445 B2 * 12/2006 Tranchina ................... 340/447
7,224,980 B2 * 5/2007 Hara ....................... 455/456.1
7,375,440 B2 * 5/2008 Suyama et al. ............. 307/10.2
2002/0084887 A1 7/2002 Arshad et al.
2002/0171537 A1 * 11/2002 Ghabra et al. ............... 340/426
2003/0164032 A1 9/2003 Nantz et al.
2003/0210128 A1 * 11/2003 Dix ........................... 340/5.27

(Continued)

FOREIGN PATENT DOCUMENTS

DE 197 32 546 C1 12/1998

(Continued)

OTHER PUBLICATIONS

International Search Report dated Jan. 13, 2005.

(Continued)

*Primary Examiner*—George A Bugg
*Assistant Examiner*—Edny Labbees
(74) *Attorney, Agent, or Firm*—Crowell & Moring LLP

(57) ABSTRACT

A device for reproducing information on a vehicle is provided, wherein a portable transponder unit is part of a keyless access and/or travel authorization system, transmitting a code to a control device, which is arranged in the vehicle, via a transceiver. A display, gas sensor and analysis device are located in the transponder device, the analysis device controlling the display so as to output a warning signal if the measured concentration of gas exceeds a critical threshold.

15 Claims, 1 Drawing Sheet

U.S. PATENT DOCUMENTS

2004/0145485 A1 * 7/2004 Tice .......................... 340/632

FOREIGN PATENT DOCUMENTS

| | | | |
|---|---|---|---|
| DE | 199 12 748 | A1 | 11/2000 |
| DE | 103 07 291 | A1 | 9/2003 |
| EP | 1 243 772 | A2 | 9/2002 |
| FR | 2 790 855 | A1 | 9/2000 |
| WO | WO 01/12457 | A1 | 2/2001 |
| WO | WO 02/46740 | A1 | 6/2002 |

OTHER PUBLICATIONS

German Search Report dated Apr. 1, 2004.

* cited by examiner

DEVICE FOR REPRODUCING INFORMATION ON A VEHICLE

CROSS-REFERENCE TO RELATED APPLICATIONS

This application is a continuation of PCT Application No. PCT/EP2004/010309 filed on Sep. 15, 2004, which claims priority to German Application No. 103 57 456.5 filed Dec. 4, 2003, the disclosures of which are incorporated by reference herein.

BACKGROUND AND SUMMARY OF THE INVENTION

The invention relates to a device for reproducing information concerning a motor vehicle and, in particular, a device for reproducing information concerning a motor vehicle having a portable transponder unit, as part of a keyless access and/or travel authorization system, which transmits a code to a control device arranged in the motor vehicle by way of a transceiver, an access and/or travel authorization being granted if the control device receives a valid code.

A device drive of this type is known from German Patent document DE 199 12 748 A1. A display can be activated only if a valid code was detected, which was initially transmitted by the transponder. The data of interest is available only to a user who identifies himself in this manner as being authorized. Other persons who do not possess a valid transponder are prevented from accessing this data. By means of the received code, the display can also automatically be updated without requiring additional operating signals of the user. Since the transmitting operation of the code signal already takes place before the initiation of the starting operation of the motor vehicle, the user can already inform himself, before he operates the ignition, about operating conditions of the vehicle that are of interest.

However, it is assumed here that the vehicle can be started without any problems, but this is not always so. If a vehicle is involved which, for example, has a hydrogen drive, possibly escaping hydrogen gas, as a rule, cannot be detected by the vehicle user, while simultaneously the starting of the vehicle may be dangerous. A display concerning operating conditions which, in contrast, are unimportant, carries the risk of a false sense of safety for the driver.

There is therefore needed a device of the above-mentioned type which clearly increases the operating safety. This, and other, needs are met by a device for reproducing information concerning a motor vehicle having a portable transponder unit, as part of a keyless access and/or travel authorization system, which transmits a code to a control device arranged in the motor vehicle by way of a transceiver, an access and/or travel authorization being granted if the control device receives a valid code. A display is arranged in the transponder unit, as well as a gas sensor and an analysis device. The analysis device controls the display for emitting a warning signal if a measured gas concentration exceeds a critical value.

According to the invention, the vehicle user additionally receives information concerning a possibly critical gas concentration. The absence of a warning signal indicates that it is safe for him to start the operation of the vehicle without a risk.

The warning signal may preferably be visual and/or acoustic. It may be supplemented by a warning signal which is emitted by the vehicle itself and which is also controlled by the analysis device.

The analysis device can preferably be activated when the transponder transmits a code. This minimizes the power consumption of the analysis device, and updates the determination of the gas concentration just at the moment at which the user of the vehicle is about to start the operation of the vehicle. During the operation of the vehicle, the measurement may be carried out several times and a warning signal may be emitted, if necessary.

In an expedient further development, it is provided that the display emits a signal during the implementation of the measurement, which signals differs from the signal after the conclusion of the measurement.

Other objects, advantages and novel features of the present invention will become apparent from the following detailed description of the invention when considered in conjunction with the accompanying drawings.

DETAILED DESCRIPTION OF THE DRAWINGS

Figure 1:
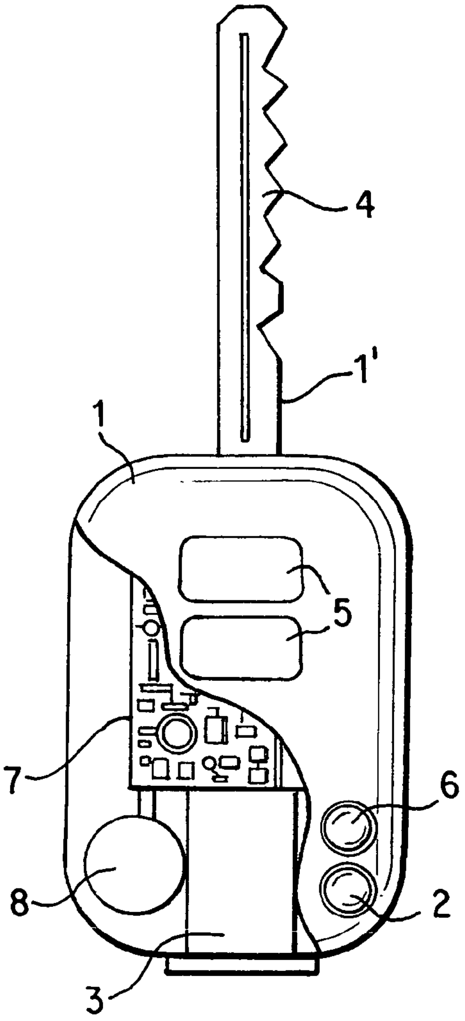
FIG. 1 is a top view of the device according to the invention.
Figure 2:
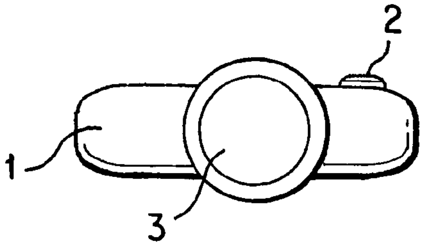
FIG. 2 is a frontal view of the device of FIG. 1.

A light-emitting diode 2, a gas sensor element 3, remote control elements 5, a warning horn 6, an analysis device 7 shown as a printed circuit board, as well as a battery 8 are situated in a housing 1 of a portable vehicle key 1' having key bit 4. The entire electronic system, by which a question-answer dialog can also be carried out within the scope of a keyless access system known per se, is disposed on the printed circuit board.

The triggering of an analysis of a possibly critical gas concentration takes place in connection with the opening or closing of the doors or during the operation of a control element in conjunction with a starting or stopping operation of the motor vehicle.

In a supplementary fashion, it is also contemplated to trigger an analysis operation arbitrarily by use of a separate control element analogous to the control elements (not shown).

For this purpose, a control element 5 (for example, OPEN) or a separate control element with the designation "H2 sensor active" is operated and the H2 measurement is started. In a supplementary fashion, the measurement may be started by way of a vehicle approach sensor (not shown), which reacts when a person approaches the vehicle. The vehicle sends out an inquiry signal. If the vehicle key 1' considers itself involved, it emits the response signal to the authorized user and simultaneously starts the measurement of the gas concentration.

As long as the measuring is taking place and no result is present yet, the light emitting diode 2 flashes in yellow, for example.

When the measurement has been concluded and no hydrogen was detected, the light emitting diode 2 flashes in green, for example.

When hydrogen is detected, the light-emitting diode may flash in red, for example. In the event of a HIGH alarm (special vol. % threshold), the light emitting diode may flash in red at double the normal frequency and, in addition, an acoustic warning (such as a high-frequency beeping sound) may take place.

The illustrated hydrogen warning device uses the same energy source (battery 8) as the normal key functions.

In a supplementary fashion, the battery 8 may be rechargeable and the charging can be carried out as long as the key 1' is inserted in the vehicle. During this time, the H2 warning function is active.

When the key 1' is not inserted, the H2 sensor returns into a "passive" condition after an applicable time.

According to the above-described method, other types of gas (for example, CO, CO2, benzene, ozone, etc.) can also be sensed by means of a corresponding sensor.

Furthermore, it is contemplated to, simultaneously with the output of a warning signal at the key, transmit a message to the vehicle in order to implement, for example, an internal safety check there, or block the access to the vehicle by means of the remote control, or initiate other safety-increasing measures.

If the vehicle itself has a gas sensor, which responds to a gas escape occurring there, the vehicle can send a corresponding message to the key. This message is emitted at the key as a warning signal and informs the user and warns him with respect to approaching the vehicle, operating the remote control or entering the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for reproducing information concerning a motor vehicle, comprising:

a portable transponder unit of at least one of a keyless access and travel authorization system, the portable transponder unit transmitting a code for receipt by a control unit arranged in the motor vehicle, at least one of an access and travel authorization being granted if the control device receives a valid code; and wherein the portable transponder unit further comprises a display, a gas sensor, and an analysis device, to sense a type of gas and measure its concentration, switched on when the portable transponder unit transmits the code, the analysis device controlling the display to emit a warning signal if the measured concentration of the sensed type of gas exceeds a critical value.

2. The device according to claim 1, wherein the warning signal is at least one of a visual and acoustic signal.

3. The device according to claim 1, wherein the analysis device is switched on in conjunction with at least one of opening and closing doors and starting and stopping the vehicle.

4. The device according to claim 3, wherein the display emits a signal while a measurement occurs, which signal differs from a signal emitted after a conclusion of the measurement.

5. The device according to claim 1, wherein the display emits a signal while a measurement occurs, which signal differs from a signal emitted after a conclusion of the measurement.

6. The device according to claim 1, wherein the concentration measurement is carried out several times during operation of the vehicle.

7. The device according to claim 3, wherein the concentration measurement is carried out several times during operation of the vehicle.

8. The device according to claim 4, wherein the concentration measurement is carried out several times during operation of the vehicle.

9. A device for reproducing information concerning a motor vehicle, comprising:

a portable transponder unit of at least one of a keyless access and travel authorization system, the portable transponder unit transmitting a code for receipt by a control unit arranged in the motor vehicle, at least one of an access and travel authorization being granted if the control device receives a valid code; and wherein the portable transponder unit further comprises a display, a gas sensor, and an analysis device, to sense a type of gas and measure its concentration, the analysis device controlling the display to emit a warning signal if a measured concentration of the sensed type of gas exceeds a critical value; and wherein, when the warning signal is emitted, the transponder unit transmits a message to the vehicle.

10. The device according to claim 3, wherein, when the warning signal is emitted, the transponder unit transmits a message to the vehicle.

11. The device according to claim 9, wherein, when the message is received, the vehicle remains in a locked condition as long as the transponder unit emits the warning signal.

12. The device according to claim 10, wherein, when the message is received, the vehicle remains in a locked condition as long as the transponder unit emits the warning signal.

13. A portable transponder unit of a vehicle keyless access system, the portable transponder unit comprising:

a housing holding a key bit;

a display arranged in the housing so as to be visible from outside of the housing;

a gas sensor and an analysis device arranged in the housing, for sensing a type of gas and measuring its concentration, the analysis device being switched on with granting of access by the vehicle keyless access system; and wherein the analysis device is operatively coupled with the display, the analysis device analyzing whether the measured concentration of the type of gas sensed by the gas sensor exceeds a critical threshold, the display outputting a warning signal if the measured concentration of gas exceeds the critical threshold.

14. The portable transponder unit according to claim 13, wherein the analysis unit controls the display to emit a first signal during a measurement of the gas and a second signal after the measurement of the gas, the first and second signals being different from one another.

15. The device according to claim 1, wherein the sensed type of gas comprises at least one of hydrogen, CO, CO2, benzene and ozone.

* * * * *